US012322884B2

(12) United States Patent
Kim, Jr. et al.

(10) Patent No.: US 12,322,884 B2
(45) Date of Patent: Jun. 3, 2025

(54) NESTED WIRE MONOPOLE HF ANTENNA

(71) Applicant: Raytheon Company, Waltham, MA (US)

(72) Inventors: Wayne Kim, Jr., Virginia Beach, VA (US); Yueh-Chi Chang, Salem, NH (US); Shane D. Blair, Salem, NH (US); Henry J. Nizko, Melbourne, FL (US)

(73) Assignee: Raytheon Company, Arlington, VA (US)

( * ) Notice: Subject to any disclaimer, the term of this patent is extended or adjusted under 35 U.S.C. 154(b) by 76 days.

(21) Appl. No.: 18/299,179

(22) Filed: Apr. 12, 2023

(65) Prior Publication Data

US 2024/0347920 A1 Oct. 17, 2024

(51) Int. Cl.
*H01Q 9/30* (2006.01)
*H01Q 21/06* (2006.01)

(52) U.S. Cl.
CPC ............. *H01Q 9/30* (2013.01); *H01Q 21/061* (2013.01)

(58) Field of Classification Search
CPC .. H01Q 9/30; H01Q 9/32; H01Q 9/40; H01Q 5/40; H01Q 21/0006; H01Q 21/06; H01Q 21/0616; H01Q 1/36; H01Q 1/362; H01Q 11/08; H01Q 11/083
See application file for complete search history.

(56) References Cited

U.S. PATENT DOCUMENTS

| | | | | | |
|---|---|---|---|---|---|
| 4,145,693 | A * | 3/1979 | Fenwick | H01Q 5/00 | 343/745 |
| 5,367,312 | A * | 11/1994 | Masters | H01Q 9/28 | 343/807 |
| 6,133,891 | A * | 10/2000 | Josypenko | H01Q 11/08 | 343/895 |
| 6,154,182 | A * | 11/2000 | McLean | H01Q 9/28 | 343/773 |
| 6,222,505 | B1 * | 4/2001 | Endo | H01Q 21/30 | 343/702 |
| 6,545,649 | B1 * | 4/2003 | Seavey | H01Q 1/242 | 343/895 |
| 6,608,598 | B2 * | 8/2003 | Gee | H01Q 9/14 | 343/773 |
| 6,693,600 | B1 * | 2/2004 | Elliot | H01Q 9/46 | 343/773 |
| 7,133,810 | B2 * | 11/2006 | Butler | H01Q 1/362 | 343/702 |
| 7,339,542 | B2 | 3/2008 | Lalezari | | |

(Continued)

FOREIGN PATENT DOCUMENTS

JP 2017152888 A 8/2017

OTHER PUBLICATIONS

Mayes et al., "Series-Fed, Nested, Edge-Loaded, Wide-Angle, Conical Monopoles;" Proceedings of the IEEE Antennas and Propagation Society International Symposium; Jun. 28, 1993; 4 Pages.

(Continued)

*Primary Examiner* — Jason M Crawford

(57) ABSTRACT

Methods and apparatus for an antenna having first and second nested monopoles each having arms with bends. In some embodiments, the monopoles are offset in clocking angle. In some embodiments, the monopoles are aligned in clocking angle. In embodiments, the bends in the arms may be located at half a total height of the antenna.

20 Claims, 9 Drawing Sheets

(56) References Cited

U.S. PATENT DOCUMENTS

| | | | | |
|---|---|---|---|---|
| 7,817,101 | B2 * | 10/2010 | Cowles | H01Q 9/27 343/895 |
| 8,059,050 | B1 | 11/2011 | Johnson | |
| 8,730,118 | B1 * | 5/2014 | McLean | H01Q 9/28 343/773 |
| 11,411,306 | B2 * | 8/2022 | Klein | H01Q 21/28 |
| 11,784,414 | B2 * | 10/2023 | Goeritz | H01Q 5/321 343/702 |
| 2002/0109643 | A1 * | 8/2002 | Buckles | H01Q 9/40 343/893 |
| 2004/0108964 | A1 * | 6/2004 | McKivergan | H01Q 1/362 343/895 |
| 2004/0183740 | A1 * | 9/2004 | Thudor | H01Q 9/40 343/799 |
| 2005/0110687 | A1 * | 5/2005 | Starkie | H01Q 5/00 343/795 |
| 2006/0022883 | A1 * | 2/2006 | Vincent | H01Q 1/36 343/722 |
| 2006/0290590 | A1 * | 12/2006 | Takaoka | H01Q 11/08 343/702 |
| 2008/0094307 | A1 * | 4/2008 | Cowles | H01Q 21/26 343/895 |
| 2010/0283693 | A1 * | 11/2010 | Xie | H01Q 9/32 343/729 |
| 2013/0012144 | A1 * | 1/2013 | Besoli | H01Q 1/36 455/84 |
| 2014/0285387 | A1 * | 9/2014 | Lindenmeier | H01Q 1/27 343/713 |
| 2017/0294714 | A1 * | 10/2017 | Lindenmeier | H01Q 9/40 |
| 2022/0115766 | A1 * | 4/2022 | Howell | H01Q 1/36 |
| 2024/0347920 | A1 * | 10/2024 | Kim, Jr. | H01Q 5/371 |

OTHER PUBLICATIONS

Puri et al., "An UWB Trapezoidal Rings Fractal Monopole Antenna with Dual-Notch Characteristics;" Research Article from the International Journal of RF and Microwave Computer-Aided Engineering; Accepted Mar. 28, 2019; 10 Pages.

Zhang et al., "An Optimum Design of Low-Profile Ultra-Wideband HF Skeletal Wire Duoconical Monopole Antenna with Parasitic Grounded Poles;" Published in 2016 IEEE-APS Topical Conference on Antennas and Propagation in Wireless Communications (APWC); Sep. 19, 2016; 4 Pages.

International Search Report and Written Opinion of the International Searching Authority dated Aug. 8, 2024 in connection with International Patent Application No. PCT/US2024/016265, 13 pages.

* cited by examiner

NESTED WIRE MONOPOLE HF ANTENNA

BACKGROUND

As is known in the art, monopole antennas can be used in a variety of applications. Some special monopoles, such as trapezoidal rings fractal monopole have up to approximately 5:1 bandwidth (2.2 to 10.8 GHz). Known monopoles may be limited by a planar design (such as microstrip), which is not practical for High Frequency (HF) applications that require monopoles to be tens of feet in height, such as 16 to 35 feet tall. Some planar monopoles may require electrically large vertical ground plate (36 mm×16 mm for 2.2-10.8 GHz), which is not feasible for HF array applications, which may require arrays in the order of 50 feet by 25 feet oriented horizontally under vertically oriented monopole. Some planar monopoles may also be limited to single element applications due to its large footprints that prevent it from array applications. Furthermore, the use of distributed lumped elements, such as resistors, inductors, pin diodes, etc., in some monopole antennas, as well as antenna arrays, strategically placed along the radiator to achieve broad band performance, reduce radiation efficiency, require external DC biasing circuitry, and increase cost. Distributed lumped element loading also limits high power operation, e.g., upwards of 10-20 kW.

Some known wideband antennas may have a so-called wide-angle aperture with apex angles near 85 degrees and are typically traveling wave type antennas formed over radial ground screen to excite Transverse Electromagnetic (TEM) waves. Wide-angled aperture antennas have such large footprints that limit the ability to form either linear or 2D arrays without introducing grating lobes and increase mutual coupling.

SUMMARY

Example embodiments of the disclosure provide methods and apparatus for multiple wire monopoles nested with each other to provide Ultra-Wideband (UWB) RF performance for a HF antenna or HF array element. Example monopole antenna embodiments may provide extra resonant paths to partially fill monopole pattern nulls at higher frequencies. In some embodiments, a monopole antenna includes a small monopole that is offset in clocking angle from a large monopole. In some embodiments, a monopole antenna includes first and second monopoles aligned in clocking angle and sharing part of their lower wires.

Embodiments of the disclosure include an HF antenna with nested wire monopoles to provide UWB RF performance covering 5 MHz to 45 MHz (9:1 bandwidth) for high power (up to 20 KW) in a slim aperture using ground screen to provide image, and not to excite TEM modes, which has never been achieved.

In one aspect, an antenna comprises: a first monopole having a first number of arms and a top and a bottom, wherein the arms of the first monopole have bends; and a second monopole having a second number of arms, wherein the second monopole is at least partially nested within the first monopole.

An antenna can further include one or more of the following features: the first monopole is offset in clocking angle from the second monopole, the first and second monopoles are aligned in clocking angle, the first and second number of arms is the same, the first number of arms is three, the first number of arms is between two and seven, the arms of the second monopole each have a bend, the respective bends form the first monopole into a diamond shape, the respective bends in the arms of the first monopole are located at one half a height of the antenna formed by the first and second monopoles, the bends in the arms of the first monopole define a width of the antenna, the antenna has a single feed for the first and second monopoles, a portion of the arms of the first monopole are shared by a portion of the arms of the second monopole, the arms of the first monopole have a diameter ranging from about 0.09 to 0.1λ, where λ is the wavelength of a mid frequency of an operating band of the antenna, the antenna formed by the first and second monopoles does not include lumped elements, the antenna provides ultra wideband performance covering over 9:1 bandwidth, the antenna forms part of an over the horizon radar, and/or low band and high band arrays formed from elements comprising the nested first and second monopoles.

In another aspect, a system comprises a means for radiating RF signals with first and second nested monopoles antennas.

In a further aspect, a method comprises: radiating a signal with an antenna comprising first and second nested monopole. A method can further include one or more of the following features: the first monopole is offset in clocking angle from the second monopole, the first and second monopoles are aligned in clocking angle, the first and second number of arms is the same, the first number of arms is three, the first number of arms is between two and seven, the arms of the second monopole each have a bend, the respective bends form the first monopole into a diamond shape, the respective bends in the arms of the first monopole are located at one half a height of the antenna formed by the first and second monopoles, the bends in the arms of the first monopole define a width of the antenna, the antenna has a single feed for the first and second monopoles, a portion of the arms of the first monopole are shared by a portion of the arms of the second monopole, the arms of the first monopole have a diameter ranging from about 0.09 to 0.1λ, where λ is the wavelength of a mid frequency of an operating band of the antenna, the antenna formed by the first and second monopoles does not include lumped elements, the antenna provides ultra wideband performance covering over 9:1 bandwidth, the antenna forms part of an over the horizon radar, and/or low band and high band arrays formed from elements comprising the nested first and second monopoles.

BRIEF DESCRIPTION OF THE DRAWINGS

The foregoing features of this invention, as well as the invention itself, may be more fully understood from the following description of the drawings in which.

DETAILED DESCRIPTION

Prior to describing example embodiments of the disclosure in detail, some information is provided. Monopole antennas refer to radio antennas that are typically straight conductors mounted over a conductive ground plane. Signals are transmitted and/or received over the length of the antenna. One side of the antenna feedline is attached to the lower end of the monopole and the other side is attached to the ground plane, with the ground plane situated over the Earth. Monopole antennas can operate as a resonant antenna where the antenna functions as a resonator for radio waves and oscillates with current waves traveling along its length, which corresponds to a wavelength of the transmitted/and/or radio waves. One common antenna is referred to as quarter-wave monopole which has a length of about one quarter of the wavelength of the operational radio waves.

Monopole antennas have an omnidirectional radiation pattern and radiate power equally in all directions perpendicular to the antenna. A monopole radiates vertically polarized signals. The radiated power varies with elevation angle with nearly zero power at the zenith. A monopole antenna situated over infinite Perfect Electric Conductor (PEC) ground will have maximum power very near the horizon, while monopole situated over finite sized ground screen will have maximum power at some elevation angle determined by the radius and conductivity of the ground screen.

Figure 1:
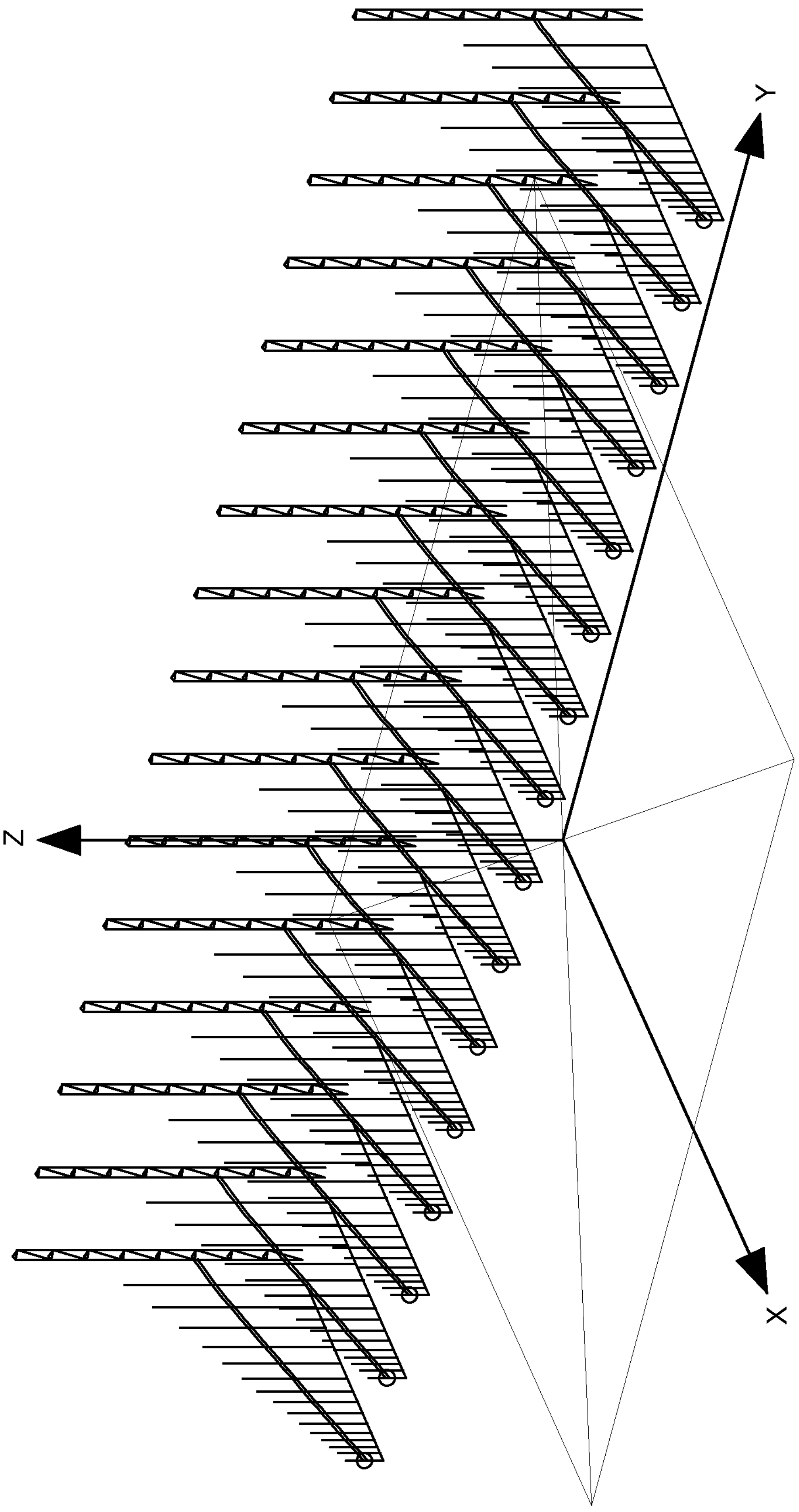
FIG. 1 PRIOR ART
FIG. 1 shows a prior art HF antenna array.

FIG. 1 shows a prior art HF antenna array for an Over the Horizon (OTH) radar. A conventional OTH radar may have two separate transmit arrays where the low band array covers the lower half of the band and the high band array covers the other half.

Figure 2:
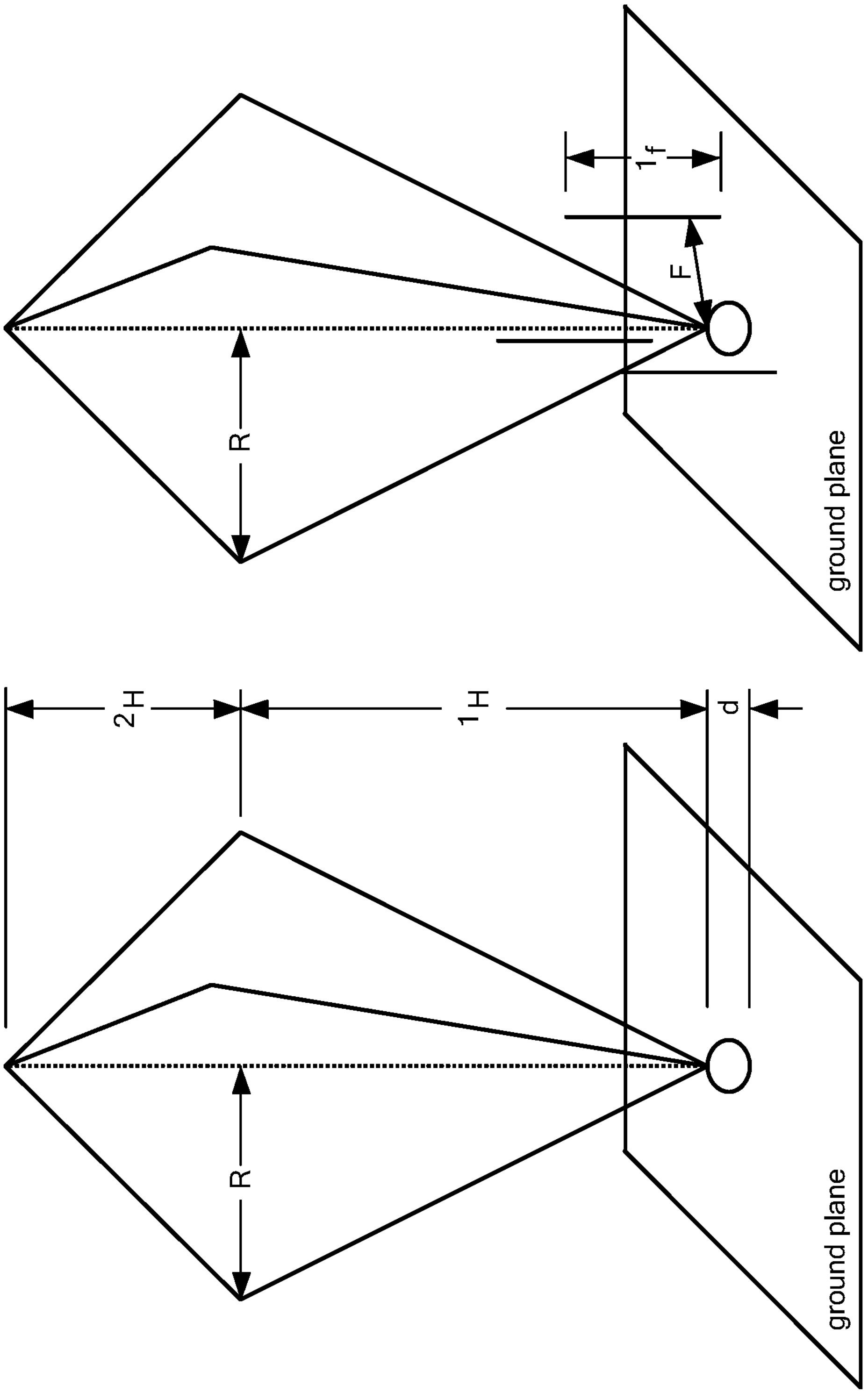
FIG. 2 PRIOR ART
FIG. 2 shows a prior art duo-conical monopole antenna.

FIG. 2 shows a prior art duo-conical monopole antenna of X.-L. Zhang et al: "An Optimum Design of Low-Profile Ultra-Wideband HF Skeletal Wire Duoconical Monopole Antenna with Parasitic Grounded Poles," which is incorporated herein by reference.

Figure 3B:
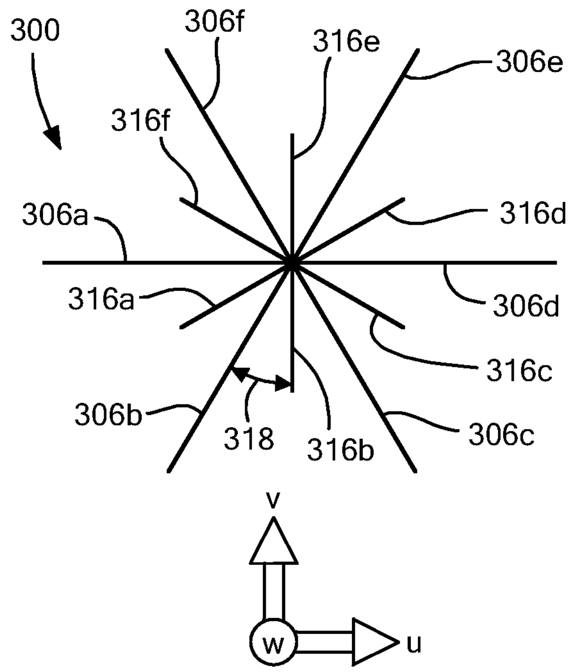
FIG. 3A is side view and FIG. 3B is top view of a nested multi-wire monopole antenna
Figure 3A:
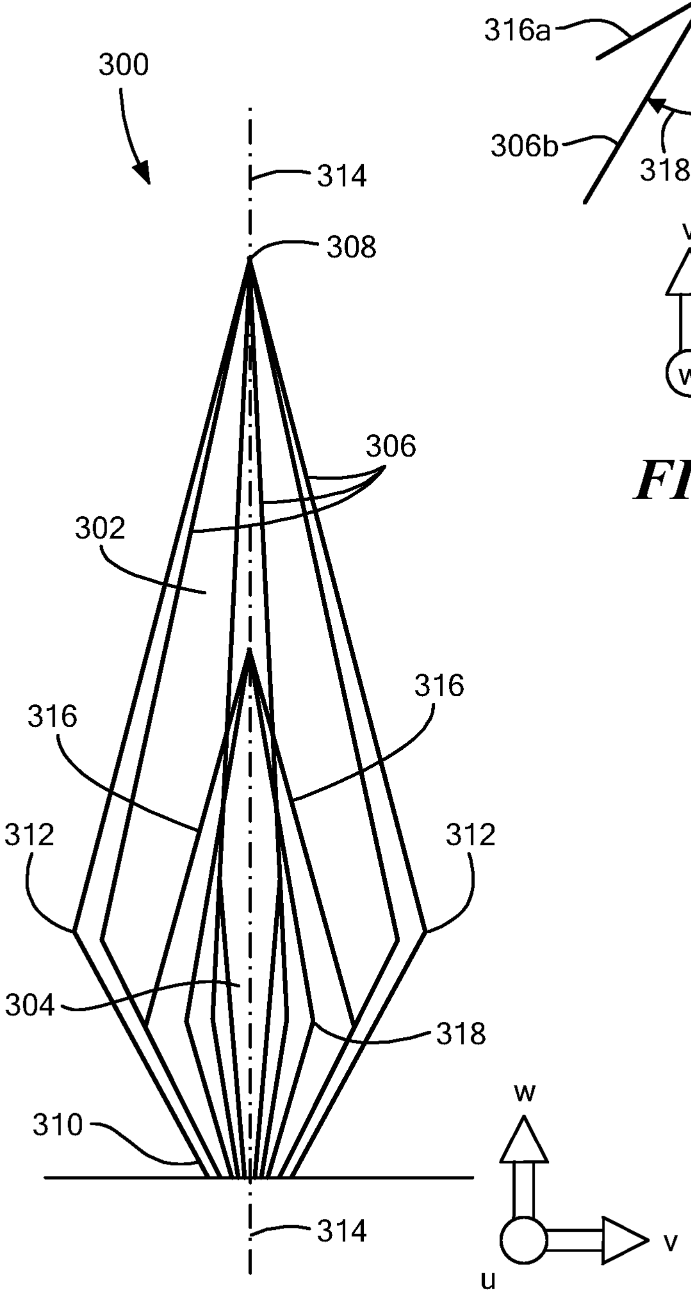

FIG. 3A is side view and FIG. 3B is top view of a nested multi-wire monopole antenna 300 in accordance with example embodiments of the disclosure. The antenna 300 includes a first monopole 302 and a second monopole 304. In the illustrated embodiment, the second monopole 304 is nested within the first monopole 302. The first monopole 302 can be considered a large monopole and the second monopole 304 can be considered a small monopole.

It is understood that the nested monopole configuration requires analyzing interactions between each aperture to achieve broadband performance in the desired directions. Each monopole is analyzed separately, with larger monopole designed for the lower frequency band and smaller monopole designed for the higher frequency band. The antennas are then combined and further tuned to remove resonances which occur near the overlap region of the two frequency bands. Optimization parameters include determining proper wire radius, determining optimal clock angles, and smoothing sharp corners to eliminate spark gaps and/or coronas.

In the illustrated embodiment, the first monopole 302 includes six equally spaced arms 306*a-f* that extend from a top 308 of the antenna to a bottom 310. It should be appreciated that indicators for u and v space are overlaid on arms of the first and second monopoles 302, 304, as shown. Each of the arms 306 has a bend 312 that extends a given radial distance from an axis 314 of the array. In the illustrated embodiment, the second monopole 304 includes six equally spaced arms 316*a-f* nested within the first monopole 302. Each of the arms 316 includes a bend 318. As can be seen, the arms 316 of the second monopole 304 are offset in clocking angle 318 from the arms 306 of the first monopole 302. The antenna is situated vertically over ground.

Figure 4B:
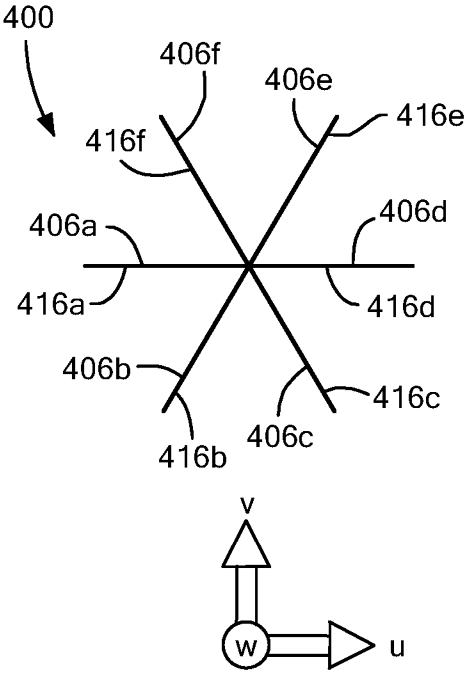
FIG. 4A is side view and FIG. 4B is top view of a nested multi-wire monopole antenna.
Figure 4A:
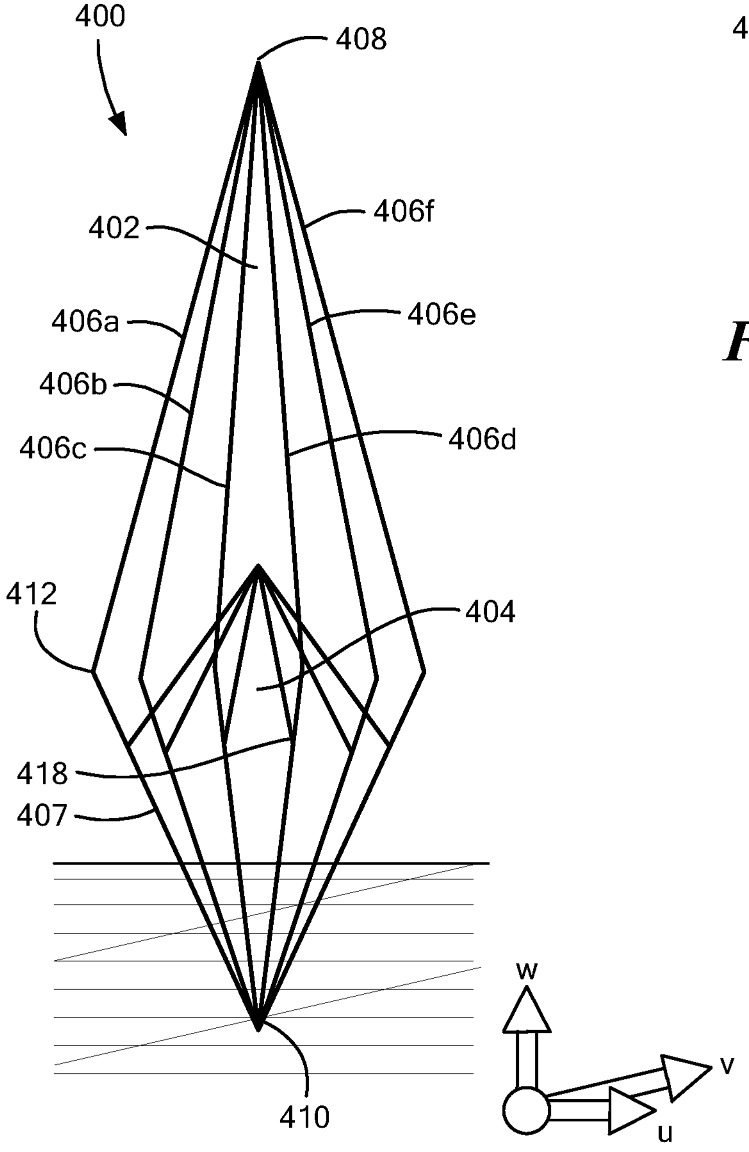

FIG. 4A is side view and FIG. 4B is top view of a nested multi-wire monopole antenna 400 in accordance with example embodiments of the disclosure. In the illustrated embodiment, the antenna 400 includes a first monopole 402 and a second monopole 404. In the illustrated embodiment, the second monopole 404 is partially nested within the first monopole 402. The first monopole 402 has six equally spaced arms 406*a-f* and the second monopole 404 has six equally spaced arms 416*a-f*. As can best be seen in FIG. 4B, the arms 406*a-f*, 416*a-f* are aligned in clocking angle so that they overlap in the vertical view.

In embodiments, the respective arms 406, 416 of the first and second monopoles 402, 404 share wire 407 from respective bends 412, 418 to the bottom 410 of the antenna. It should be appreciated that indicators for u and v space are shown for first and second monopoles 402, 404, as shown.

Figure 5B:
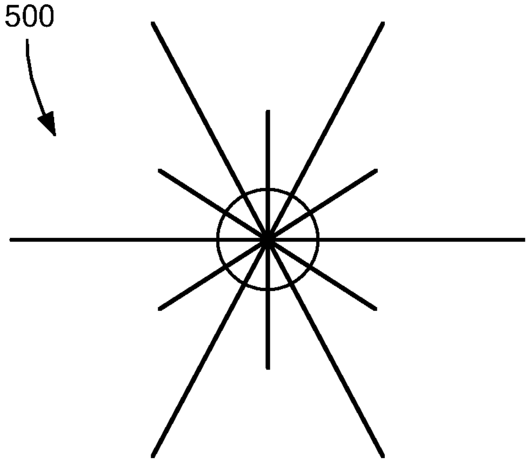
FIG. 5A is side view and FIG. 5B is top view of a nested multi-wire monopole antenna.
Figure 5A:
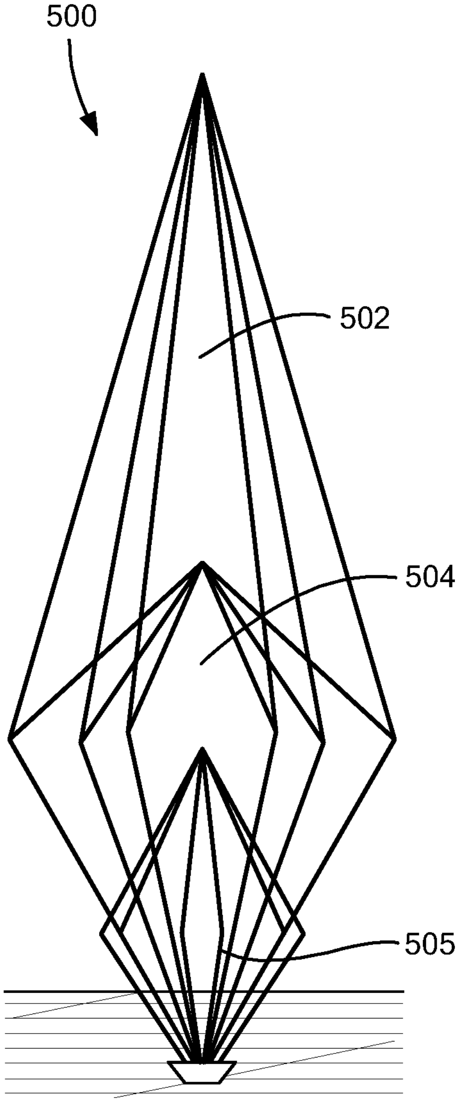

FIG. 5A is side view and FIG. 5B is top view of a nested multi-wire monopole antenna 500 in accordance with example embodiments of the disclosure. In the illustrated embodiment, the antenna 500 includes a first monopole 502, a second monopole 504, and a third monopole 505. In the illustrated embodiment, the second monopole 504 is partially nested within the first monopole 502, and the third monopole 505 is partially nested within the first and second monopoles. As can be seen, in a manner shown in FIGS. 3A and 3B, the first and second monopoles 502, 504 of the antenna 500 are offset in clocking angle, and in a manner shown in FIGS. 4A and 4B, first and second monopoles 502, 504 share wires for arms 506, 516 of the monopoles.

Figure 6A:
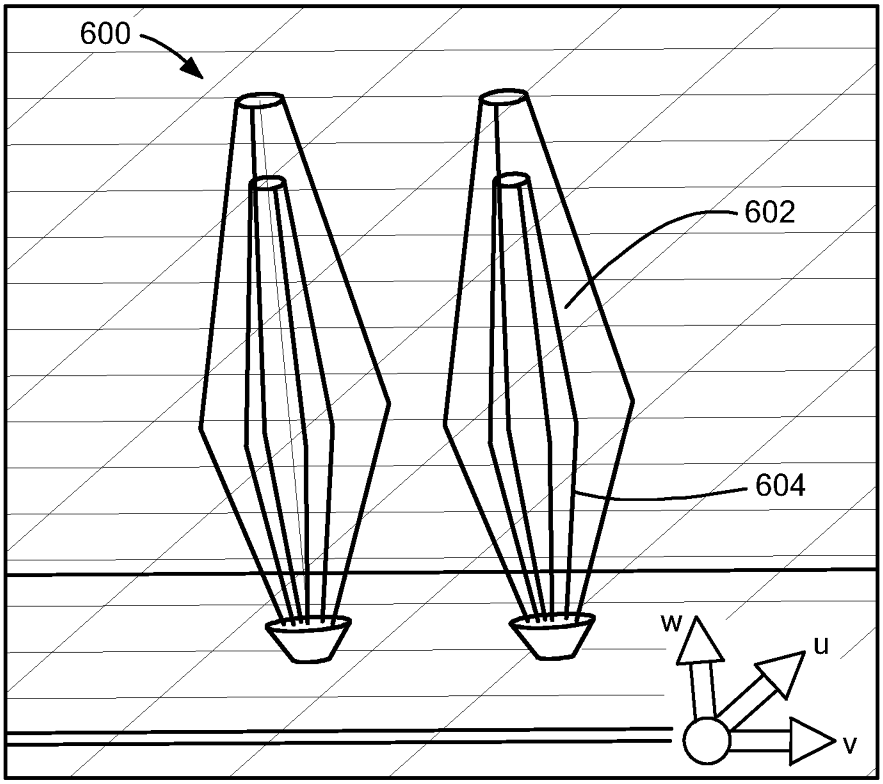
FIG. 6A is side view and FIG. 6B is top view of a nested multi-wire monopole antenna.
Figure 6B:
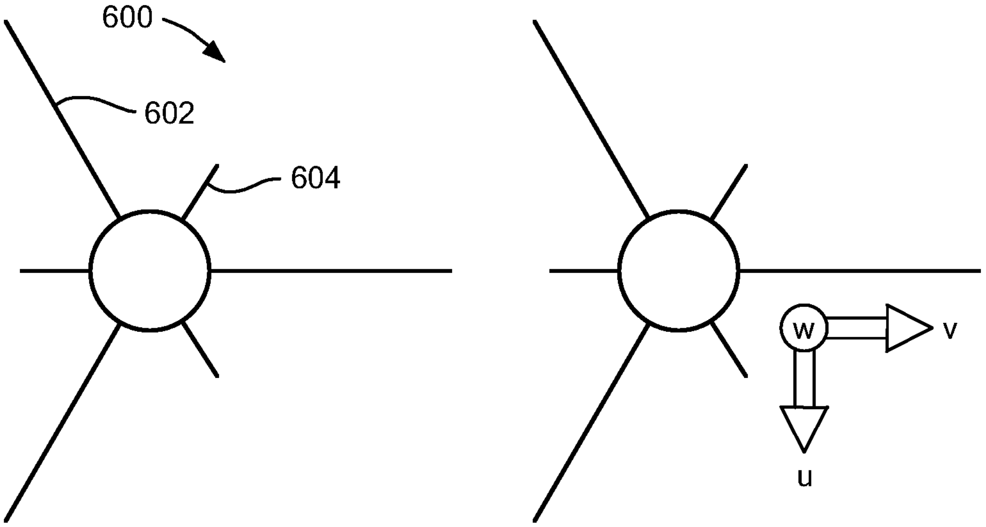

FIG. 6A is side view and FIG. 6B is top view of a nested multi-wire monopole antenna 600 in accordance with example embodiments of the disclosure. In the illustrated embodiment, the antenna 600 includes a first monopole 602 and a second monopole 604 each having three equally spaced arms and a symmetrical clocking angle.

Figure 7:
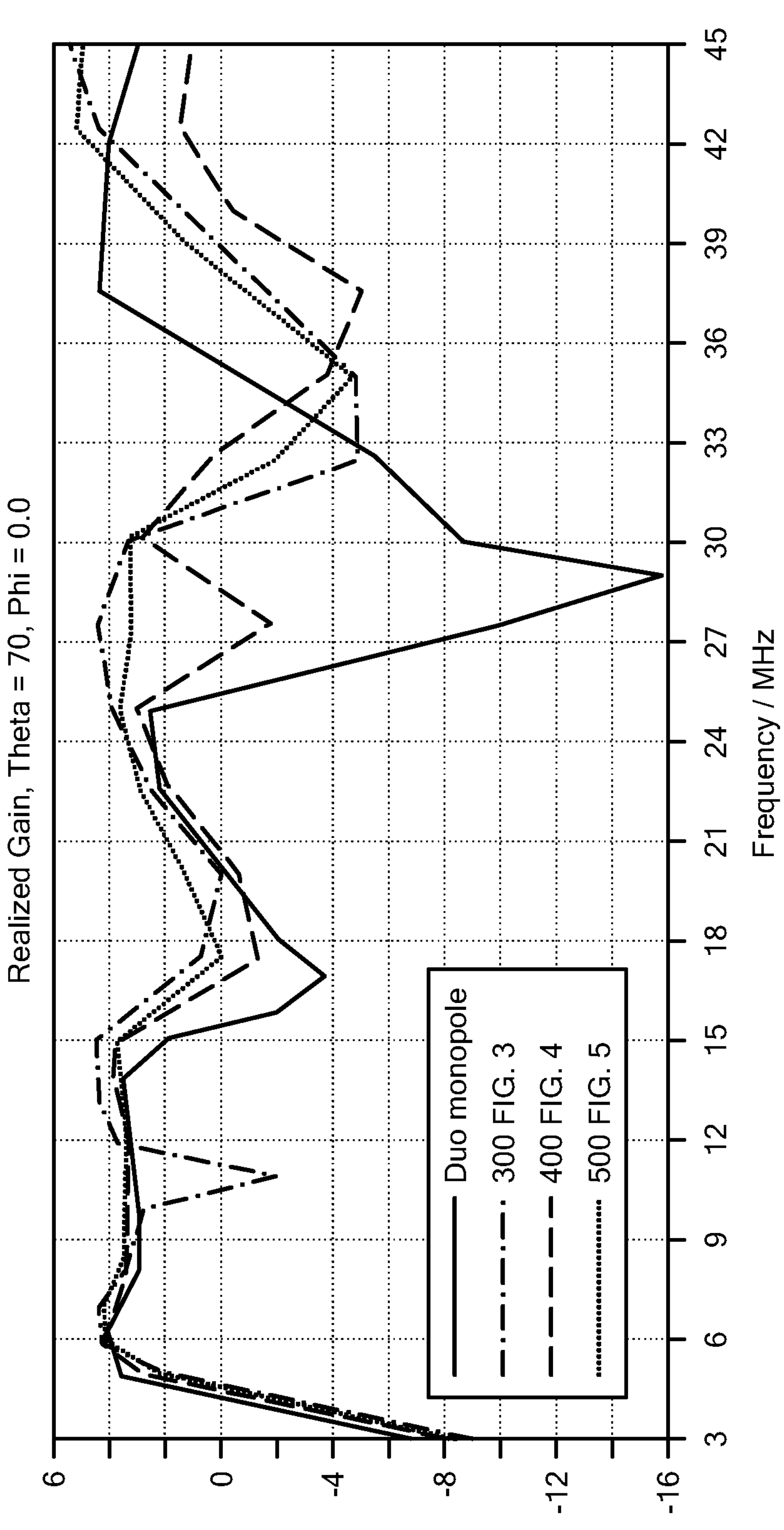
FIG. 7 shows example performance for monopole antennas shown in FIG. 3, FIG. 4 and FIG. 5.

FIG. 7 shows example performance for the monopole antenna 300 of FIG. 3, monopole antenna 400 of FIG. 4, monopole antenna 500 of FIG. 5, and a conventional duo monopole antenna. As can be seen, the example nested monopole antennas 300, 400, 500, provide ultra wideband (UWB) RF performance for HF antenna and/or HF array elements. Monopole 300 (FIG. 3) provides a good balance between performance vs complexity and cost. Monopole 400 (FIG. 4) is simpler in construction than monopole 300 but less gain and higher return loss. Monopole 500 (FIG. 5) has wider bandwidth than monopoles 300 and 400 with additional complexity.

As compared to conventional monopole antennas, example monopole embodiments provide additional resonant paths to partially fill monopole pattern nulls at higher frequencies. Example monopole embodiments provide ultra wideband performance covering 5 to 45 MHz (9:1 bandwidth), which has never before been achieved.

Example embodiments of the disclosure provide A nested wire monopole ultra-wide band HF antenna having a diamond-shaped structure oriented perpendicular to the earth, as well as perpendicular to radial ground screen. The radial ground screen is located between the monopole and the earth and is oriented parallel to the earth. Radiation polarization is vertical electric. The ground screen provides maximum directive gain at low elevation angles for over the horizon radar.

It is understood that any practical number of nested monopole antennas can be used. While example embodiments show two nested monopoles, in other embodiments, three antennas are nested. The larger monopoles radiate nearer the lower end of the frequency band while the smaller (nested) antennas radiate nearer the higher end of the frequency band. Each of nested antennas are designed separately and combined into one aperture with a single feed and further optimized to eliminate unwanted resonances.

It is understood that the arms of the monopole can comprise any suitable conductive material in any suitable shape. For example, monopole arms can be tubular, circular, and/or square. In some embodiments, the diameter of the arms range from about 0.09-0.1 $\lambda$ based on providing structural stability without compromising performance, where $\lambda$ is the wavelength corresponding to the mid frequency of the operating band.

In embodiments, the smaller, nested antennas have the same number of arms as the larger antenna and may be clockwise staggered and symmetrically centered to fill in the available space from the larger elements. In embodiments, the arm bends, which define the width of the antenna, are located at or near the mid-point of the total antenna height. The point where the arms intersect is located at the top and bottom of each radiator to form a junction that can be assembled as a pointed tip, rounded endcap, and/or grouped and fastened on a circular plate as a common connection platform. Electrical continuity needs to be maintained at this junction throughout. In embodiments, the radial dimension of the circular plate should not exceed about 0.05 $\lambda$, and the plate thickness should be thicker than many skin depths.

In embodiments, the antenna has a single feed which feeds all nested monopoles, located at the base. Balanced excitation is achieved with one connection made to the base and the other connection made to the radial ground screen, which is oriented parallel to the surface of the earth. In an example embodiment, a feed can include a current balun with a 50 $\Omega$ coaxial cable input.

Figure 8B:
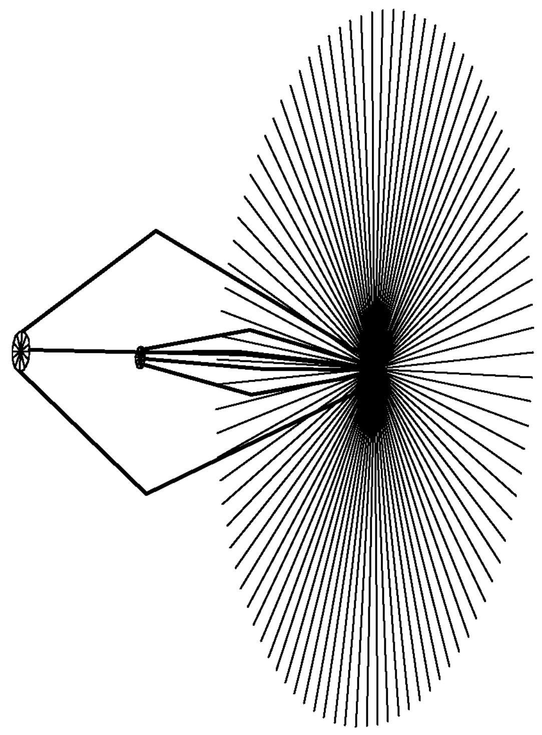
FIG. 8B shows a monopole antenna over ground screen.
Figure 8A:
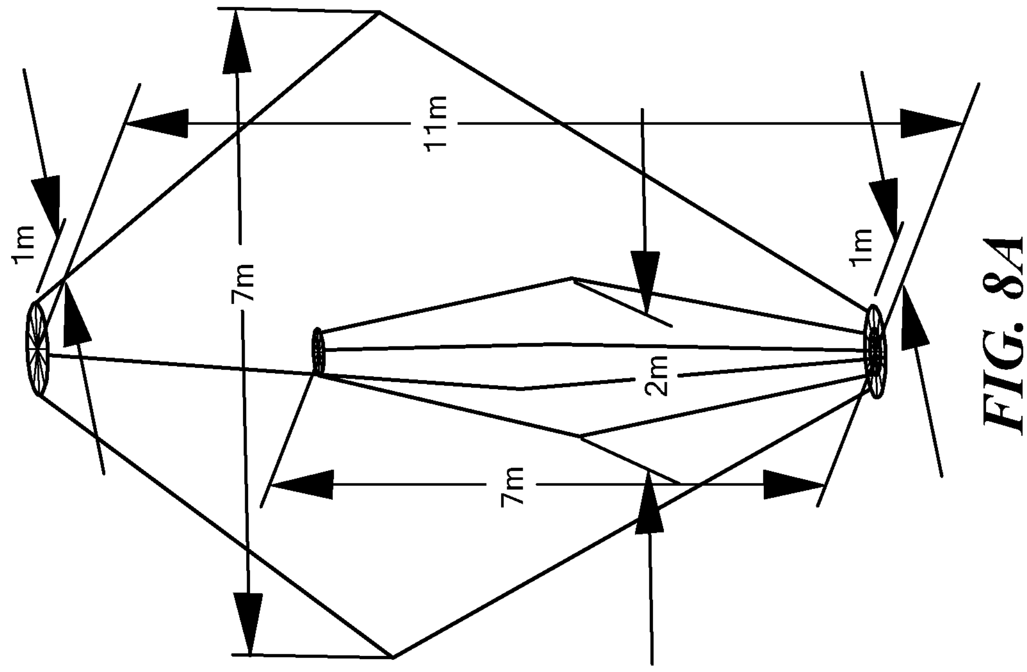
FIG. 8A shows example dimensions for an illustrative monopole antenna.

As an example, shown in FIGS. 8A (example dimensions) and 8B (antenna over ground screen and over earth), for HF application between about 3-30 MHz (6:1 bandwidth) with three arms, the maximum antenna height is about 11 m, width about 7 m, and bend location height of about 5.5 m. The inner nested monopole height is about 7 m, width about 2 m, and bend height of about 3.5 m. The diameter of the monopole wires is about 8 inches to enable structural stability.

In example embodiments, the antenna is constructed using steel, aluminum, or similar electrically conductive materials with proper arm diameter, as described above. High power applications of up to about 20 kW are achieved with high efficiency, based on the thin skin depth of the material where one skin depth is the depth of the metal thickness at which about 63% of the current flows. For arm diameters of about 0.09-0.1 $\lambda$, the material thickness is orders of magnitudes thicker than one skin depth, therefore radiation efficiency is high. In embodiments, the antenna does not require distributed loads such as inductors, capacitors, or resistors which reduce radiation efficiency at high power. High power corona effects are minimized by eliminating sharp bends as well as sharp corners.

Broad band array applications (up to about 6:1) that require high directive gain near the horizon (above ground screen), wide angle scanning, and low mutual coupling may need to use two-dimensional (2D) arrays. Spiral arrays having mixed narrow band, as well as the nested wire monopole ultra-wide elements, formed in a non-uniform spiral radius, have low grating lobes and low mutual coupling. Also, spiral arrays with approximately constant unit cell size arranged like that of the lattice of the center of a sunflower plant demonstrate very low grating lobes, as well as very low mutual coupling. Rotational symmetry allows for the ability to rotate the antenna with non-overlapping guy wires to reduce mutual coupling for fixed unit cell size.

Example embodiments of a nested monopole provide antennas provide performance characteristics that have never been achieved. For, example, U.S. Pat. No. 6,608,598 to Mayes requires the use of distributed lumped elements (resistors, inductors, pin diodes, etc.) strategically placed along the radiator to achieve broad band performance reduces radiation efficiency and requires external DC biasing circuitry.

In contrast, example embodiments of a nested monopole UWB antenna do not require any lumped elements so that higher efficiency is achieved, and losses are based only on ohmic losses of the structure.

Also, distributed lumped element loading in conventional arrays also limits high power operation, where high power refers to up to 20 kW. The ability to form arrays for wide angle aperture antennas which excite TEM modes are difficult since the aperture angle expands to about 85 degrees, and unit cell size becomes too large.

Figure 9:
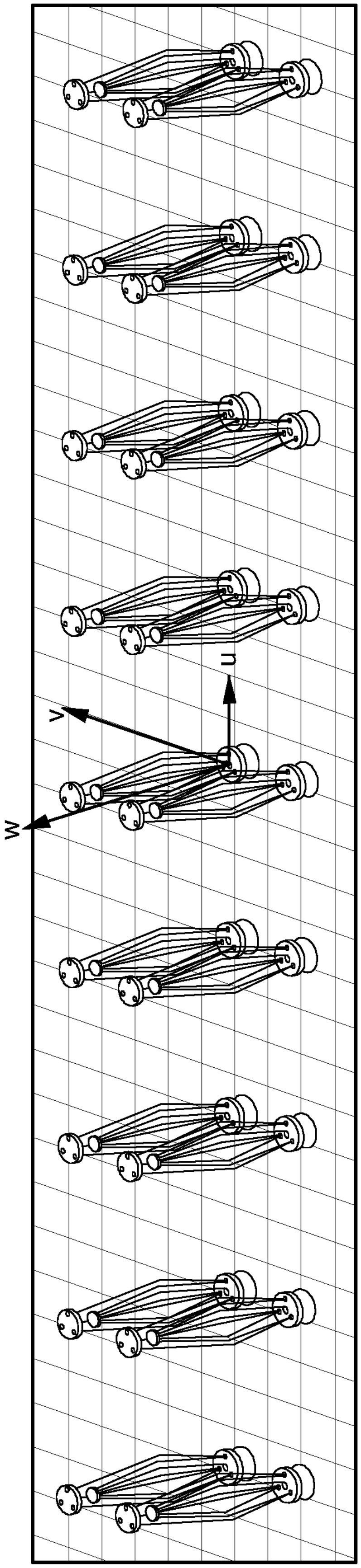
FIG. 9 is a schematic representation of an example embodiment of a two-row linear array having nested monopole antennas.

FIG. 9 shows an example embodiment of a two-row linear array having nested monopole antennas in accordance with illustrative embodiments of the disclosure. The two-row array may be well suited for OTH radar systems.

Various embodiments of the concepts, systems, devices, structures, and techniques sought to be protected are described herein with reference to the related drawings. Alternative embodiments can be devised without departing from the scope of the concepts, systems, devices, structures, and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer “A” over layer “B” include situations in which one or more intermediate layers (e.g., layer “C”) is between layer “A” and layer “B” as long as the relevant characteristics and functionalities of layer “A” and layer “B” are not substantially changed by the intermediate layer(s). The following definitions and abbreviations are to be used for the interpretation of the claims and the specification. As used herein, the terms “comprises,” “comprising, “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted that the term "selective to, "such as, for example, "a first element selective to a second element," means that the first element can be etched and the second element can act as an etch stop.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately," "substantially," and "about" mean within ±5% of a value unless defined in a different way. For example, a first direction that is "substantially" perpendicular to a second direction refers to a first direction that is within ±5% of making a 90° angle with the second direction.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

What is claimed is:

1. An antenna, comprising:

a first monopole having a first number of arms and a top and a bottom, wherein the arms of the first monopole have bends; and a second monopole having a second number of arms, wherein the second monopole has a height less than a height of the first monopole, and wherein the second monopole is at least partially nested within the first monopole.

2. The antenna according to claim 1, wherein the first monopole is offset in clocking angle from the second monopole.

3. The antenna according to claim 1, wherein the first and second monopoles are aligned in clocking angle.

4. The antenna according to claim 1, wherein the first and second numbers of arms are equal.

5. The antenna according to claim 1, wherein the first number of arms is three.

6. The antenna according to claim 1, wherein the first number of arms is between two and seven.

7. The antenna according to claim 1, wherein the arms of the second monopole each have a bend.

8. The antenna according to claim 7, wherein the bends in the arms of the first monopole form the first monopole into a diamond shape.

9. The antenna according to claim 8, wherein the bends in the arms of the first monopole are located at one half a height of the antenna formed by the first and second monopoles.

10. The antenna according to claim 9, wherein the bends in the arms of the first monopole define a width of the antenna.

11. The antenna according to claim 1, wherein the antenna has a single feed for the first and second monopoles.

12. The antenna according to claim 1, wherein portions of the arms of the first monopole are shared by portions of the arms of the second monopole.

13. The antenna according to claim 1, wherein the arms of the first monopole have a diameter ranging from about 0.09 to 0.1λ, where λ is a wavelength of a mid-frequency of an operating band of the antenna.

14. The antenna according to claim 1, wherein the antenna formed by the first and second monopoles does not include lumped elements.

15. The antenna according to claim 1, wherein the antenna provides ultra-wideband performance covering over 9:1 bandwidth.

16. The antenna according to claim 1, wherein the antenna forms part of an over-the-horizon radar.

17. The antenna according to claim 16, further including low-band and high-band arrays formed from elements comprising the first and second monopoles.

18. The antenna according to claim 1, further comprising:

a third monopole having a third number of arms, wherein the third monopole has a height less than the height of the second monopole, and wherein the third monopole is at least partially nested within the second monopole.

19. A system, comprising:

a feedline;

a ground plane attached to one side of the feedline; and first and second monopoles coupled to another side of the feedline, the second monopole at least partially nested within the first monopole;

wherein the first monopole has a first number of arms and a top and a bottom, wherein the arms of the first monopole have bends; and wherein the second monopole has a second number of arms, wherein the second monopole has a height less than a height of the first monopole.

20. A method, comprising:

radiating a signal with an antenna comprising first and second monopoles;

wherein:

the first monopole has a first number of arms and a top and a bottom, wherein the arms of the first monopole have bends; and the second monopole has a second number of arms, wherein the second monopole has a height less than a height of the first monopole, and wherein the second monopole is at least partially nested within the first monopole.

* * * * *